(12) United States Patent
Lelacheur (10) Patent No.: US 9,961,138 B2
(45) Date of Patent: May 1, 2018

(54) FIBER-BASED DISTRIBUTED DATA CENTER ARCHITECTURE

(71) Applicant: Justin G. Lelacheur, Alpharetta, GA (US)

(72) Inventor: Justin G. Lelacheur, Alpharetta, GA (US)

( * ) Notice: Subject to any disclaimer, the term of this patent is extended or adjusted under 35 U.S.C. 154(b) by 22 days.

(21) Appl. No.: 15/044,238

(22) Filed: Feb. 16, 2016

(65) Prior Publication Data

US 2017/0237807 A1 Aug. 17, 2017

(51) Int. Cl.
*H04L 29/08* (2006.01)
*H04Q 11/00* (2006.01)
*H04L 29/12* (2006.01)

(52) U.S. Cl.
CPC ........ *H04L 67/101* (2013.01); *H04L 61/2567* (2013.01); *H04L 67/1008* (2013.01); *H04L 67/1021* (2013.01); *H04Q 11/0067* (2013.01)

(58) Field of Classification Search
CPC .............. H04L 67/101; H04L 61/2567; H04L 67/1008
See application file for complete search history.

(56) References Cited

U.S. PATENT DOCUMENTS

| | | | | |
|---|---|---|---|---|
| 9,154,589 B1* | 10/2015 | Klein | ................... | H04L 69/329 |
| 2010/0067908 A1* | 3/2010 | Weitz | ..................... | H04L 49/90 398/58 |
| 2010/0306408 A1* | 12/2010 | Greenberg | .......... | H04L 12/4633 709/238 |
| 2013/0003538 A1* | 1/2013 | Greenberg | .............. | H04L 47/12 370/230 |
| 2014/0321858 A1* | 10/2014 | Cook | ..................... | H04L 63/02 398/116 |
| 2015/0180778 A1* | 6/2015 | Shraer | ................... | H04L 49/356 370/238 |
| 2015/0326316 A1* | 11/2015 | Watanabe | .............. | H04B 10/27 398/58 |

(Continued)

OTHER PUBLICATIONS

Central Office Re-architected as Data Center from Open Neworking Summit Jun. 2015—SDN showcase slides.*

(Continued)

*Primary Examiner* — Jeffrey M Rutkowski
*Assistant Examiner* — Basil Ma
(74) *Attorney, Agent, or Firm* — Thompson Hine, LLC (57) ABSTRACT

Systems and methods use a fiber-based network to provide both network access services such as Internet, television, phone, and wide area networking services as well as distributed data processing services. Distributed computing nodes are provided in broadband gateways at homes and other premises in a fiber-based network to realize a distributed data center architecture. In a specific example, a provider deploys a number of broadband gateways in the homes of homeowners who agree to pay for network access (e.g., Internet, phone, television, etc.) that is received over a fiber-based (preferably point-to-point) network at the broadband gateways in the homes. Those broadband gateways also separately provide distributed workload processing. Providing both network access and distributed workload processing makes the deployment and use of the fiber-based network more economically and technically feasible.

23 Claims, 6 Drawing Sheets

(56) References Cited

U.S. PATENT DOCUMENTS

2017/0187629 A1* 6/2017 Shalev ................ H04L 43/0823

OTHER PUBLICATIONS

AT&T Domain 2.0 Vision White Paper Nov. 13, 2013.*
https://wiki.onosproject.org/display/ONOS14/Federated+ONOS+Web+UI Federated ONOS.*
Peterson et al. Central Office Re-Architected as a Data Center IEEE Communications Magazine Oct. 2016.*
Korpela et al SETI@Home—Massively Distributed Computing for SETI 2001 Computing in Science and Engineering vol. 3 Issue 1.*
RAD to Demo vCPE on D-NFV with HP's Virtual Services Router at MWC, TechTeam, dated Feb. 15, 2016, pp. 1-3.
Ackerman, Evan, "Heat Your House with Someone Else's Computers", IEEE Spectrum, posted Nov. 13, 2014, pp. 1-3.
Markoff, John, "Microsoft Plumbs Ocean's Depths to Test Underwater Data Center", The New York Times, Technology, dated Jan. 31, 2016, pp. 1-5.

* cited by examiner

FIBER-BASED DISTRIBUTED DATA CENTER ARCHITECTURE

TECHNICAL FIELD

The present invention relates to communication and data networks and to data center computing. More specifically, the present invention relates to distributed computation of workloads such as high-performance computing workloads and to optical fiber-based communication networks.

BACKGROUND

Modern data centers make use of warehouse like buildings which aggregate hundreds, thousands or even tens of thousands of computing servers and storage within a single facility. The computing servers are located together in a single facility to facilitate quick communications between the devices and to make it easier to monitor and maintain the devices. These facilities are often connected to long distance networks, such as the Internet, and to other data center facilities. This access is done through interconnection of service provider networks at private and public interconnection points, such as Internet exchanges located in various geographic aggregation points across the world. Internally, data centers use cabling that permits each server to send and receive packets to upstream switches. Typically, data centers that manage large-scale cloud computing services are centrally managed using one or more management systems and controllers.

The large number of computing servers within data centers generate significant levels of heat, often requiring expensive, dedicated cooling systems. Further, the electrical power of such data centers place significant demands for very high power electrical grid systems to power them and redundant power sources are required to ensure that local power outages do not disrupt data center workloads. While much research and development has gone into improving the efficiency of data center systems, the cooling and power requirements continue to impose significant burdens on data center design, deployment, and management.

Systems used to provide communication and network access services to homes and other premises face entirely different challenges than those plaguing modern data centers. Optical fiber-based networks are being built to provide high-speed Internet access to consumers. These networks use optical fibers to link a central office switching center and broadband gateways located at the consumer premises. Such a network has the potential to provide gigabit or faster Internet access, among other access services. These fiber optic access networks are commonly referred to as fiber-to-the-home (FTTH), fiber-to-the-building (FTTB), or fiber-to-the-premises (FTTP), and are referred to herein collectively as "fiber-based" networks.

The rate at which these fiber-based networks are being built has been slow. Internet Service Providers (ISPs) have been discouraged by the costs of building these networks and are often discouraged by concerns over how quickly they can earn back a profitable return. Additionally, where fiber-based networks have been implemented for consumer network access, the fiber-based network have employed a slower and cheaper point-to-multi-point architecture rather than the faster and more expensive point-to-point technique, since many consumers are unwilling to pay the differential costs for the faster technique.

SUMMARY

One embodiment of the present invention uses a fiber-based network to provide both network access services and distributed data processing services. The technique collocates distributed computing processors within broadband gateways at homes and other premises in the fiber-based network to realize a distributed data center architecture in addition to providing network access to the premises using those broadband gateway devices. The expense of the fiber-based network is justified by using the network to provide two functions (network access to consumers and distributed workload processing for workload customers) that each separately generates revenue. This novel architecture overcomes the existing challenges of the formerly disparate architectures used to provide centralized data center computing and consumer network access. In contrast to the prior arts, the fiber-based network is used to provide both network access services such as Internet, television, phone, and wide area networking services as well as the workload processing services.

In a specific example, a number of broadband gateways are deployed in the homes of homeowners who agree to individually pay for network access (e.g., Internet, phone, television, etc.) that is received over the fiber-based (preferably point-to-point) network at the broadband gateways in their homes. Those broadband gateways also separately provide distributed workload processing. In a specific example, a research university agrees to pay a fee for processing a large workload of data requiring two hundred of the broadband gateways. Those broadband gateways (and the associated fiber-based network connections) are thus justified by fees from the homeowners using the broadband gateways for network access, the fee from the research university for the data processing, and potentially fees from other workload customers that use those broadband gateways for workload processing. Providing both network access and distributed workload processing makes the deployment of the fiber-based network more economically and technically feasible.

Collocating computing processors in the broadband gateways installed at consumer locations distributes the processing servers, i.e., the workload processors, and eliminates the need for centralized data center warehouses with their burdensome electrical and cooling systems requirements. While the workload processors are distributed, centralized management of the computing processors is also enabled using one or more centralized controllers located in one or more central office switching centers. Further, by using the fiber-based network for a non-access service, such as the distributed computing nodes, additional applications and services may utilize the fiber-based network infrastructure further warranting its build-out and investment.

In one embodiment of the invention, a broadband gateway device includes one or more processors that perform traditional gateway functions (e.g., network address translation (NAT), wired/wireless networking, etc.) and distributed processing operations. In one example, a broadband gateway has one processor for gateway functions and one processor for distributed workload processing. For example, a distributed computing node (processor, memory, storage, etc.) and gateway components are etched onto a single physical printed circuit board (PCB). One or more network controllers are also included in the broadband gateway. In one example, a broadband gateway includes a multi-host optical network controller used to multiplex/de-multiplex signals from the upstream fiber-based network and downstream hosts collocated in the device or connected from other on premise device terminals. The multi-host optical network controller is used by both the processor performing the gateway functions and the processor performing the distributed processing functions.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

As described above, two disparate technologies (data center processing and network access provision) each suffer from different deficiencies. Centralized data centers are burdened with cooling and power requirements. Network access providers, on the other hand, are unable to engineer economically feasible high performance fiber-based networks. These problems are addressed by a single fiber-based network that provides both network access and data processing functions. The fiber-based network provides very high speed communications that are often required for the data center-type workload processing and that are desirable for the consumer's network access. The fiber-based network, in one embodiment, provides point-to-point fiber-based network connection to each premises at which a broadband gateway is located.

As used herein, the phrase "fiber-based" refers to communication using optical fibers including, but not limited to fiber-to-the-home (FTTH), fiber-to-the-building (FTTB), or fiber-to-the-premises (FTTP). Fiber-based communications and networks often involve pure fiber-optic connections running from an Internet Service Provider (ISP) to a consumer's home or business. Fiber optic cables are made of one or more optical fibers that carry light. In one example, an optical fiber is covered with two layers of plastic to create a mirror around the fiber. Light signals travel through the fiber and bounces off the mirror-like sides to stay within the fiber. In one example, data signals are sent through a fiber-optic cable using a laser that flashes on and off at precise time intervals to send each bit of data. An example fiber-based network connects one device to another device (e.g., a broadband gateway at a customer premises) to another device (e.g., a centralized switching center) using only fiber-optic connections. In this example, all of devices in the network (i.e., the end points and any intermediate devices) are connected to one another using optical fibers.

As used herein, the phrase "broadband gateway" refers to a networking devices used to connect devices in a home or other single premises to the Internet, wide area network (WAN), or other outside network. In one example, a "broadband gateway" performs Network Address Translation (NAT). NAT refers to techniques used to remap one Internet Protocol (IP) address space into another by modifying network address information in IP datagram packet headers while they are in transit across a traffic routing device. NAT allows a single Internet connection with a single public IP address to be shared with the multiple devices used at the premises.

As used herein, the phrase "premises" refers to a house or building, together with its land and outbuildings, occupied by an individual, family, business, or other consumer. Network access is provided on a premises by premises bases. Whether "premises" is used in the singular or plural will be apparent from the context. Generally, each premises is associated with a respective consumer, i.e., network access is paid for per premises. For example, two different consumers individually sign up for network access to each receive Internet, phone, television, and/or other network services at their respective home or business premises. Multiple premises can be located in a single building, for example, in the case of a multi-tenant apartment complex. Network access for the devices at a given premises will generally be supported using a single broadband gateway, i.e., there will generally be a one to one to one relationship between network access account, broadband gateway, and premises.

As used herein, the phrase "processor" refers to a physical component that processes a signal, information, or instructions. One example of a processor is a microprocessor or Central Processing Unit (CPU) that is a small chip or circuitry that resides in a computer or other device that receives input and provides an appropriate output. As used herein, the phrase "access processor" refers to a processor that is used to provide network access to one or more other devices at a premises. In a specific example, an access processor performs network address translation (NAT). As used herein the phrase "computing processor" refers to a processor used to perform a computation including, but not limited to, computations required to perform a portion of a distributed workload.

As used herein, the phrase "centralized switching center" refers to a location from which optical signals of a fiber-based network are distributed to multiple recipients. A centralized switching office center also performs switching functions, for example, converting signals from a fiber-based network to signals in another type of network such as the Internet.

As used herein, the phrase "workload" refers to an amount of work to be performed by one or more processors. The phrase "distributed workload" refers to an amount of work to be performed by distributed processors located at different premises.

As used herein, the phrase "distributed workload controller" refers to a device, component of a device, or other functional unit that controls the distribution of performance of a distributed workload on distributed processors. In one embodiment of the invention, a distributed workload controller is implemented in multiple "child" distributed workload controllers that coordinate with one another to control the distribution of performance of a distributed workload.

As used herein, the phrase "network controller" refers to a component that connects one or more computers, computer nodes, or processors to a network. The phrase "multi-host network controller" refers to a controller that connects multiple computers, computer nodes, or processors to a network.

As used herein, the phrase "point-to-point architecture" refers to a direct connection between two devices without splitting. One example of a point-to-point architecture in a fiber-based network includes a switch at a centralized switching center connected by multi-fiber distribution cable to an aggregation serving area interface in a cabinet on the street, where the serving area interface has multiple optical cross connects each connected by fiber drop cable to a broadband gateway at a premises. In one example, these connections are dedicated and full, meaning that the download and upload speed and bandwidth are the same.

Figure 1:
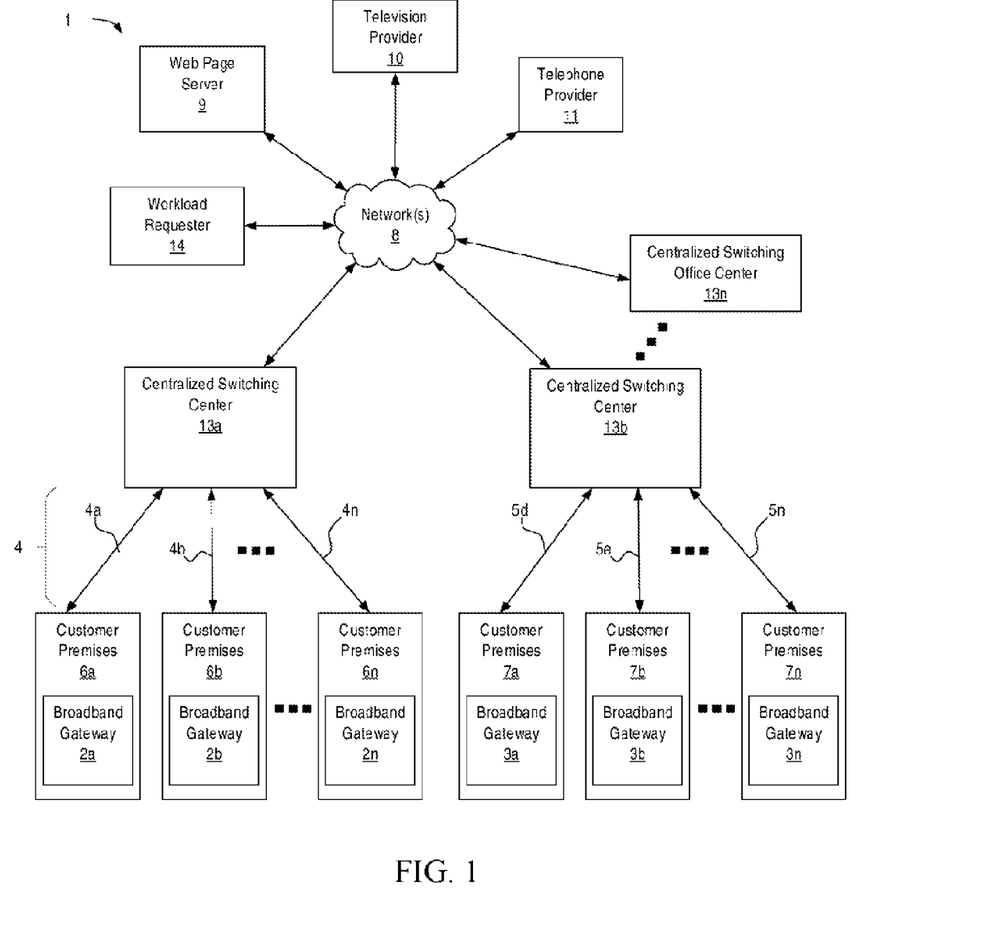
FIG. 1 is a system diagram depicting an example of a network environment in which broadband gateways distributed on a fiber-based network provide network access and distributed processing.

Referring now to the drawings, FIG. 1 is a system diagram depicting an example of a network environment 1 in which broadband gateways 2a-n, 3a-n distributed on a fiber-based network 4 (e.g., via optical fiber connections 4a-n, 5a-n) provide network access and distributed processing at customer premises 6a-n, 7a-n. In this example, customers at customer premises 6a-n, 7a-n contract with a service provider to receive network access to services on network(s) 8. Access to network(s) 8 enables the customers to receive web pages, such as web pages from web page server 9, television service from television provider 10, telephone service from telephone provider 11, and security system services from security system service provider 12, as examples.

Network access is provided to the customers at the customer premises 6a-n, 7a-n through fiber-based network 3. For example, customer premises 6a has a broadband gateway 2a that is connected to centralized switching center 13a through optical fiber 4a. The centralized switching center 13a connects to network(s) 8, for example, to access services available through the Internet. In one example, television provider 10 sends television signals through ethernet cables in network(s) 8 to the centralized switching center 13a. Centralized switching center 13a switches the ethernet-based television signals to optical signals and sends the optical signals through optical fiber 4a to the broadband gateway 2a at the customer premises 6a. The broadband gateway 2a sends the signals to a television device (not shown) at premises 6a that is used by the customer to view desired television programming. Generally, centralized switching centers 13a-n link the broadband gateways 2a-n, 3a-n via the fiber-based network 4 to network services available on the network(s) 8. Because of the high-speed connections of the fiber-based network 3, the network access provided to the customers at customer premises 6a-n, 7a-n provides a highly desirable network access experience for the customers.

The broadband gateways 2a-n, 3a-n are also used to process distributed workloads. For example, a workload requester 14 sends a request through network(s) 8 that is received at one or more of the centralized switching office centers 13a-n. The centralized switching centers 13a-n distribute portions of the workload to be performed by one or more of the broadband gateways 2a-n, 3a-n at the customer premises 6a-n, 7a-n. Because of the high-speed connections of the fiber-based network 3, the distributed processing at customer premises 6a-n, 7a-n provides a highly desirable processing rate. In one example, the communication speed over fiber-based network 4 is comparable to the processing speed at the broadband gateways 2a-n, 3a-n.

A given workload can be serviced by broadband gateways on multiple centralized switching centers 13a-n. If one broadband gateway fails, or even all broadband gateways for an entire centralized switching center (such as when there is a large scale electrical blackout), the processing can be switched to other available broadband gateways. By having the capability to distribute processing across, multiple centralized switching centers 13a-n in multiple geographic locations, the system can flexibly respond to power outages and other exceptional circumstances.

In one embodiment of the invention, the fiber-based network 4 is a point to multi-point (i.e., a passive optical network) in which an array wave guide or similar device is used to split one fiber optic input into fiber optics for multiple premises. In another embodiment, the fiber-based network 4 uses a point-to-point architecture to provide faster communication capabilities to support higher performance computing requirements. For example, the communication speeds can be comparable or otherwise configured to support the processing speeds of the distributed processing that occurs on the broadband gateways 2a-n, 3a-n. The fiber-based network 4 is configured in one embodiment of the invention to provide transmit speeds that allow the distributed processing to process workloads in similar times as workloads are processed by warehouse-style data centers. In one example, a point to point architecture in a fiber-based network provides communication speeds of up to or even exceeding 25 Gigabits (Gb) Ethernet to provide processing that is comparable with warehouse data centers that connect processors using 25 Gb Ethernet and the like. Existing Internet Service Providers do not provide 25 Gb Ethernet or similar speeds to consumer residences. Accordingly, this embodiment of the invention provides a means of offering faster network access to consumer residences than existing systems.

Figure 2:
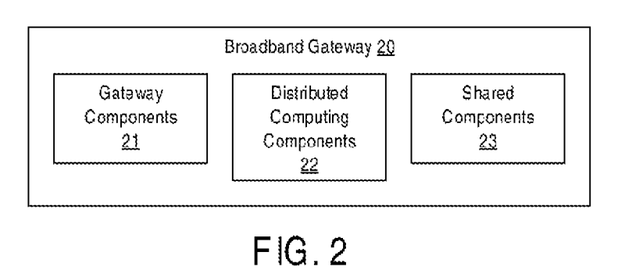
FIG. 2 is a block diagram illustrating an example of a broadband gateway.

FIG. 2 is a block diagram illustrating an example of a broadband gateway 20. The broadband gateway 20 includes gateway components, distributed computing components 22, and shared components 23. The gateway components 21 perform functions traditionally performed by on-premises broadband gateway devices. In one embodiment of the invention, broadband gateway components 21 furnish Internet access abilities to electronic devices, such as computers, televisions, telephones, security cameras, etc., at the premises.

In one embodiment of the invention, the gateway components 21 function as an Internet Protocol (IP) router, permitting all devices on a wired and/or wireless local network to access the network. This involves network address translation (NAT) in one example. In this example, devices on the local network each are given a private IP address, and the broadband gateway components 21 translate packets from those private devices and send the translated packets out as though the packets all came from the broadband gateway 20 using the broadband gateway's public IP address that is addressable on the Internet.

In one embodiment of the invention, the gateway components 21 additionally or alternatively provide firewall capabilities. In one example, this involves blocking certain ports that are not used by a consumer.

The distributed computing components 22 provide distributed computing functions at the broadband gateway 20. In one embodiment of the invention, the distributed computing components 22 are functionally separate from the gateway components 21 (e.g., using separate processors, etc.). In one embodiment of the invention the separately-functioning distributed computing components 22 and gateway components 21 are etched onto a single circuit board to provide a more compact and/or aesthetically pleasing broadband gateway 20.

The shared components 23 are used by both the gateway components 21 and the distributed computing components 22 to perform their respective functions.

Figure 3:
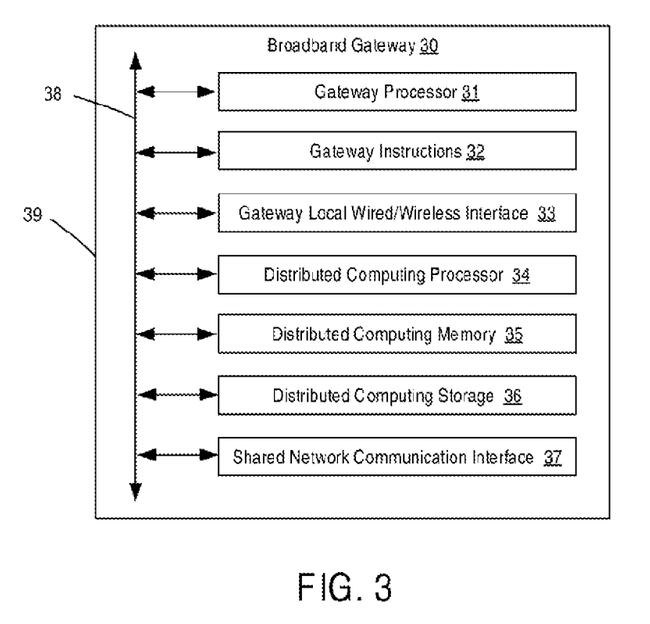
FIG. 3 is a block diagram illustrating another example of a broadband gateway.

FIG. 3 is a block diagram illustrating another example of a broadband gateway 30. The broadband gateway 30 includes a gateway processor 31 to perform traditional gateway functions to provide network access to devices at the premises. Generally, the gateway processor can be a relatively low-end processor that is designed to do basic functions. The gateway processor 31 executes gateway instructions 32 to provide network access to the devices at the premises using a gateway local wired/wireless interface 33. For example, the gateway local wired/wireless interface 33 provides a wired and/or wireless network to which the devices at the premises are able to connect.

In broadband gateway 30, the distributed computing processor 34, distributed computing memory 35, and distributed computing storage 36 for a distributed computing node. In this example, the distributed computing processor 34 is communicatively coupled to the distributed computing memory 35 and executes computer-executable program code and/or accesses information stored in the distributed computing memory 35 or distributed computing storage 36 to perform distributed computing tasks. The distributed computing processor 34 may comprise a microprocessor, an application-specific integrated circuit ("ASIC"), a state machine, or other type of processor. In one embodiment, an X86-type processor or similarly powerful processor is used for the distribute computing processor 34. The distributed computing processor 34 can include one processor or more than one processor, for example, for parallel processing.

The distributed computing memory 35 and distributed computing storage 36 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language. In one embodiment of the invention, the distributed computing storage 36 includes an operating system, underlying supporting applications, and client specific software.

The shared network communication interface 37 is used by both the gateway processor 31 and the distributed computing processor 34 to send and/or receive optical signals including data outside of the premises on a fiber-based network. In one example, a multi-host network controller is used. The multi-host network controller can also provide Remote Direct Memory Access (RDMA) over Ethernet to the distributed computing processor's random direct access memory (RAM). A bus 38 is also included to communicatively couple one or more components of the broadband gateway 30. The broadband gateway 30 may also comprise a number of external or internal devices such as input or output devices. For example, the broadband gateway 30 could include an input/output ("I/O") interface configured to receive input from input devices or provide output to output devices. A housing 39 encloses the broadband gateway 30 components in this example. The housing 39 allows one or more optical, data, and/or power cables to attach to the broadband gateway 30.

In the example of FIG. 3, the broadband gateway includes separate processors to perform traditional gateway functions and distributed computing functions. In some, but not necessarily all, circumstances it is advantageous to use separate processors for these different functions. For example, using separate processors can make it easier and/or cheaper to implement a more powerful processor for the distributed computing. Many existing gateway applications are designed and implemented for low-end processors. Those existing applications can be used in an embodiment the invention if a low-end processor is included in the broadband gateways. Using existing and proven applications can save time, costs, and reduce errors since new applications need not be created, tested, and debugged. However, the low-end processors used for traditional broadband gateway applications will be ill-suited for many distributed computing tasks. Accordingly, it is advantageous to include a more powerful processor for distributed computing tasks but to use shared components, such as shared network communication interface 37, were feasible to reduce the size and complexity of the broadband gateways. Additionally, the gateway processor 31 and distributed computing processor 34 can be etched separately but located on the same physical circuit board to reduce the overall size and aesthetic appeal of the broadband gateway housing 39.

Figure 4:
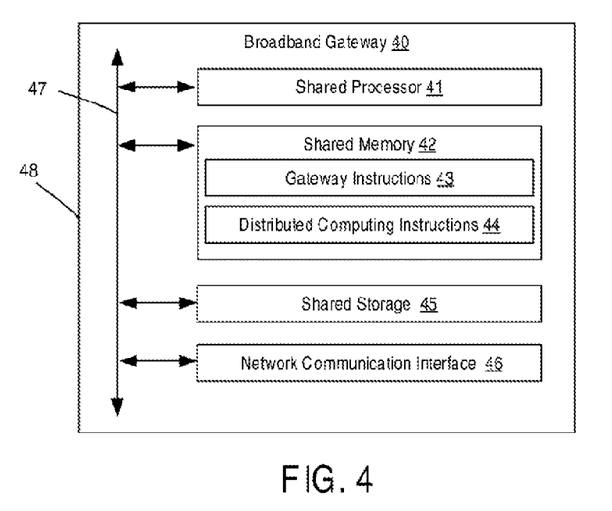
FIG. 4 is a block diagram illustrating another example of a broadband gateway.

FIG. 4 is a block diagram illustrating another example of a broadband gateway 40. In this example, a single processor, shared processor 41, is used to perform traditional gateway functions and distributed computing functions. In this example, the shared processor 41 is communicatively coupled to a shared memory 42 and executes computer-executable program code (gateway instructions 43 and distributed computing instructions 44) and/or accesses other information stored in the shared memory 42 or shared storage 45 to perform tasks. The shared processor 41 may comprise a microprocessor, an application-specific integrated circuit ("ASIC"), a state machine, or other type of processor. In one embodiment, an X86-type processor or similarly powerful processor is used. While combining functions on one processor may introduce overhead, security issues, and technical complexity that could penalize performance or create concern over security risks, doing so can provide advantages in certain circumstances. For example, future advances in processing and computing may make it advantageous to combine processing on a single processor. As another example, more powerful gateway network access applications may be developed in the future requiring the use of a more powerful processor.

The shared memory 42 and shared storage 45 in broadband gateway 40 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language.

The broadband gateway 40 also includes a network communication interface 47 used by the shared processor 41 to send and/or receive optical signals including data outside of the premises on a fiber-based network. A bus 47 is also included to communicatively couple one or more components of the broadband gateway 40. The broadband gateway 40 may also comprise a number of external or internal devices such as input or output devices. For example, the broadband gateway 40 could include an input/output ("I/O") interface configured to receive input from input devices or provide output to output devices. A housing 48 encloses the broadband gateway 40 components in this example. The housing 48 allows one or more optical, data, and/or power cables to attach to the broadband gateway 40.

Figure 5:
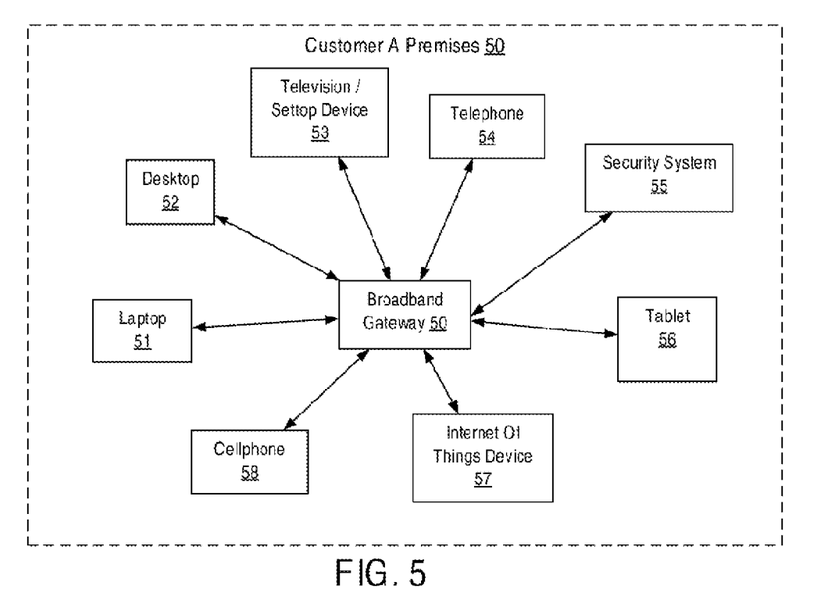
FIG. 5 is a block diagram illustrating an example of a broadband gateway providing network access to devices at a customer premises.

FIG. 5 is a block diagram illustrating an example of a broadband gateway 50 providing network access to devices 51-58 at a customer premises 50. In this example, the broadband gateway 50 provides a WIFI network to which a laptop 51, desktop 52, television and/or set top box 53, telephone 54, security system 55, tablet 56, Internet-of-Things device 57, and cellphone 58 connect. Connecting to the broadband gateway 50 to access the external networks is controlled and/or secured. For example, connection to the broadband gateway 50 to access the external networks requires entry of a passcode in one embodiment of the invention.

Certain embodiments of the invention co-locate distributed computing functionality in broadband gateways that are deployed on the premises of consumers. Adding functionality (and potentially complexity and cost) to broadband gateways is counter to conventional wisdom and current development trends that counsel the advantages of minimizing the functionality performed by broadband gateways and the desire to reduce the associated costs. For example, the state of the art teaches that it is advantageous to use network function virtualization to reduce the functions performed by broadband gateways. Following the trend of network function virtualization, many service providers are changing their systems so that some traditional broadband gateway functions (e.g., firewall services) are performed on the cloud rather than on the broadband gateways themselves. The state of the art thus teaches reducing functionality from broadband gateways to drive down costs. This teaching in the state of the art teaches away from aspects of certain embodiments of the present invention that intentionally enhance the functionality of the broadband gateways.

In contrast to the trend in the art to reduce broadband gateway complexity and cost, certain embodiments of the present invention are based on recognizing that providing more functional broadband gateways can provide additional sources of revenue to both justify the additional cost of the additional broadband gateway features and justify the costs of a fiber-based network to the premises that supports those features. There are also additional advantages to putting centrally-managed distributed computing nodes on broadband gateways in multiple different premises as opposed to together in a single warehouse. In a warehouse, a large collection of processors often has significant cooling and power backup requirements. In contrast, distributing the computing nodes to multiple premises distributes the heat so that specialized cooling equipment is unnecessary. Similarly, distributing the computing nodes to multiple premises also distributes the nodes on different portions of an electrical grid and/or on multiple different electrical grids. This means that an electrical outage at a transformer, a switching station, or in a certain area will only affect a portion of the computing nodes and thus will not shut down the distributed processing. The portion of workloads performed by out of service distributed nodes can simply be reassigned to other computing nodes in the system. In other words, locating computing nodes on multiple premises distributes the heat, provides automatic power redundancy, and otherwise provides a system that is resilient, powerful, and scalable.

Figure 6:
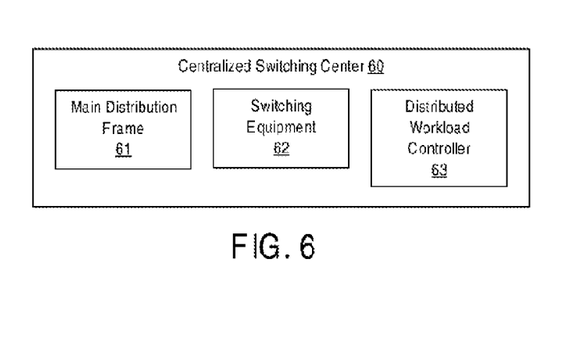
FIG. 6 is a block diagram illustrating an example of a centralized switching center.

FIG. 6 is a block diagram illustrating an example of a centralized switching center 60. In this example, the centralized switching center 60 includes a main distribution frame 61, switching equipment 62, and a distributed workload controller 63. The centralized switching center 60 allows a fiber-based network to connect to one or more other networks such as the Internet. The main distribution frame 61 is the interface between optical fibers on the fiber-based network that connect to consumer premises and the switching equipment 62 of the centralized switching center 60 that connects to one or more other networks. The distributed workload controller 63 receives workload requests and distributes the processing of portions of those requests. The centralized switching center 60 can be configured to suit the particular system implementations.

Figure 7:
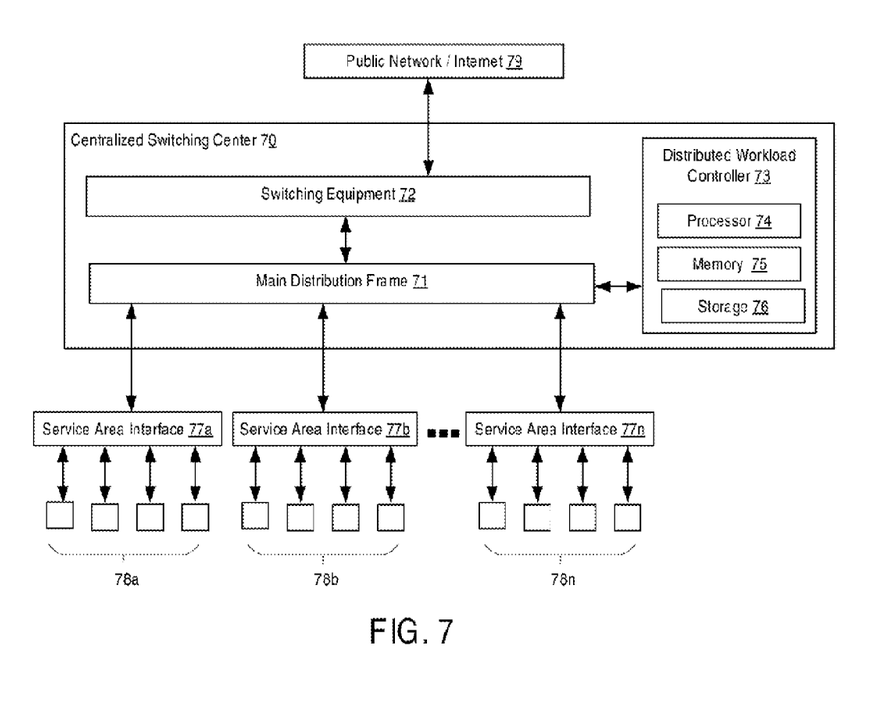
FIG. 7 is a block diagram illustrating an example of another centralized switching center communicating with an upstream network and service area interfaces.

FIG. 7 is a block diagram illustrating an example of an implementation of a centralized switching center 70 communicating with a public network 79 and service area interfaces 77*a-n*. In this example, the main distribution frame 71 is an interface for bundled optical fibers received from service area interfaces 77*a-n*, and connects to the switching equipment 72. Switching equipment 72 switches the optical signals from the main distribution frame 71 and non-optical signals on the public network/Internet 79. Each of the service area interfaces 77*a*-77*n* acts as an intermediary in the fiber based network to connect sets of nodes 78*a-n*, where each node is a broadband gateway at a different premises. In the case of a point-to-point architecture, a single fiber optic connection runs to each premises without being split. In the case of a point to multi-point architecture, an array wave guide or similar device at each service area interface 77*a-n* is used to split one fiber optic input into fiber optics for multiple premises. The centralized switching center can also use a RDMA over Converged Ethernet (RoCE) technique to facilitate the distribution of portions of a workload using the high-speed fabric of the fiber-based network at different premises. In one embodiment of the invention, RDMA is performed at the network level by the multi-host network controller of the broadband gateways and switch equipment 72 located in the centralized switching center 70.

The centralized switching center 70 in this example includes a distributed workload controller 73 that includes a processor, memory, and storage. In a system that employs multiple centralized switching centers, distributed workload controller in the different centers can be connected, e.g., via a wide area network (WAN), so that the child controllers can coordinate workload processing and function as a single controller for capacity and redundancy purposes.

The distributed workload controller 73 in this example is implemented as a computing device. The computing device include a processor 74 that is communicatively coupled to a memory 75 and that executes computer-executable program code and/or accesses information stored in the memory 75 or storage 76. The processor 74 may comprise a microprocessor, an application-specific integrated circuit ("ASIC"), a state machine, or other processing device. The processor 74 can include one processing device or more than one processing device. The memory 75 and storage 76 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, and JavaScript.

The distributed workload controller 73 may also comprise a number of external or internal devices such as input or output devices. In one example, the distributed workload controller 73 provides a workstation (not shown) for an individual to monitor performance of the distributed workload controller 73. For example, such a workstation could display error logs and/or provide an override function for the individual to override automatic workload distribution determinations made by the distributed workload controller 73. A bus (not shown) can also be included to communicatively couple one or more components of the distributed workload controller 73.

In one example, the distributed workload controller 73 stores information about broadband gateways at nodes 78a-n, for example, tracking the respective processing and/or storage capabilities of the different broadband gateways and/or tracking the status (i.e., busy, idle, error, etc.) of the different broadband gateways. The distributed workload controller 73, in this example, uses the stored broadband gateway information to allocate portions of workloads to be performed on particular broadband gateway devices. The distributed workload controller 73, in another example, is configured to prioritize certain workloads. For example, one workload customer may request and/or pay extra to have a workload prioritized. Code breaking for a government agency may be prioritized over domestic workloads in one example. The distributed workload processor can also allocate workload portions based on information about the workloads. For example, workload processing may be sold based on number of processors (e.g., 50 processors costs $X, 100 processors costs $Y, etc.) or combined processor core count (e.g., X cores rate 1 costs $Y, etc.). The workload can be distributed based on the processing performance that the workload customer pays for.

The distributed workload controller 73 can also prioritize or otherwise allocate workload portions based on the type of workload. For example, high performance computing (HPC) workloads may be assigned to faster broadband gateway processors than workloads that do not require HPC, such as general web server applications. Examples of workloads that may require HPC include, but are not limited to, breaking down a genome, advanced mathematics, financial analysis, nuclear and other physics applications, and encryption and code breaking.

Figure 8:
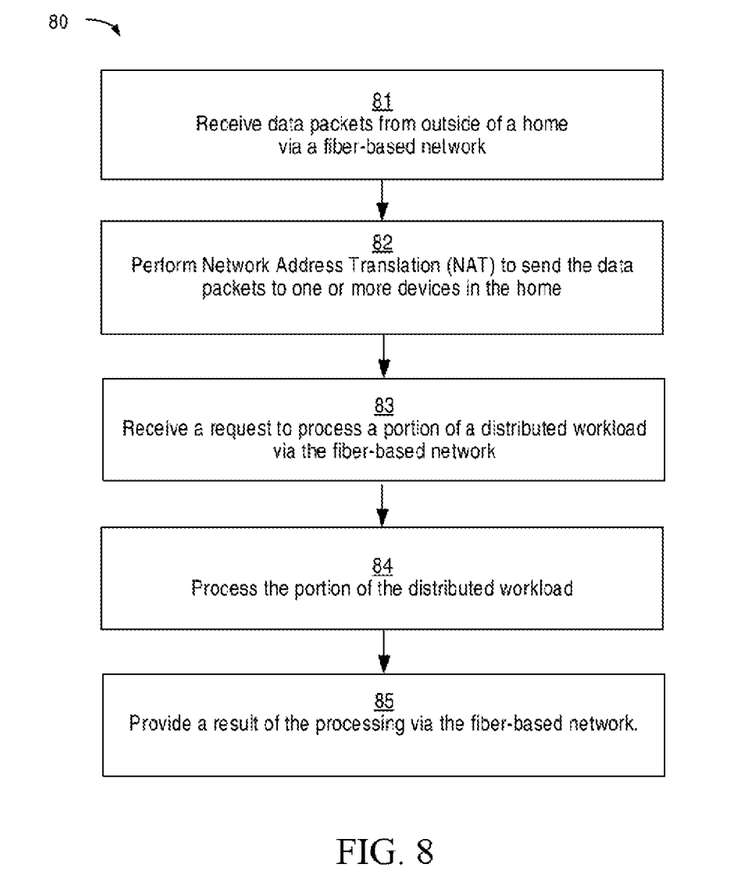
FIG. 8 is a flow chart of an exemplary method for providing Internet access and distributed workload processing using a fiber-based network.

FIG. 8 is a flow chart of an exemplary method 80 for providing Internet access and distributed workload processing using a fiber-based network. Method 80 can be performed by the broadband gateways of FIGS. 1-5 or any other suitable devices or systems. Method 80 involves receiving data packets from outside of a home via a fiber-based network, as shown in block 81. The broadband gateway performs Network Address Translation (NAT) to send the data packets to one or more devices in the home, as shown in block 82. In one embodiment, NAT is performed by a processor of the broadband gateway to send and receive data packets from computers, laptops, televisions, and other devices in the home.

The broadband gateway also receives a request to process a portion of a distributed workload via the fiber-based network, as shown in block 83. In response to the request, the broadband gateway processes the portion of the distributed workload, as shown in block 84, and provides a result of the processing via the fiber-based network, as shown in block 85. In one example, a distributed workload controller on the fiber-based network sent the request for the broadband gateway in the home to process the portion of the workload and receives the result of the processing. The distributed workload controller distributes the workload to multiple broadband gateways in multiple homes.

Figure 9:
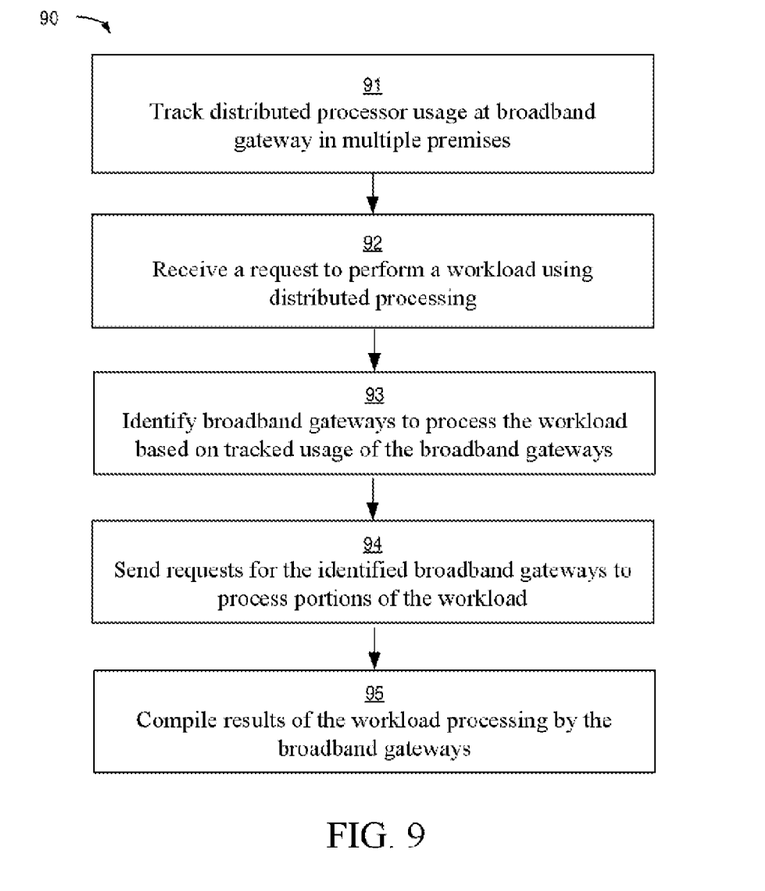
FIG. 9 is a flow chart of an exemplary method for controlling distributed processing of a distributed workload using broadband gateways via a fiber-based network.

FIG. 9 is a flow chart of an exemplary method 90 for controlling distributed processing of a distributed workload using broadband gateways via a fiber-based network. Method 90 can be performed by the distributed workload controllers of FIGS. 6-7 or any other suitable devices or systems. Method 90 involves tracking distributed processor usage at broadband gateways in multiple premises, as shown in block 91. For example, this involves keeping track of which broadband gateway processors are currently occupied processing a portion of a workload and which are idle and thus available for processing.

Method 90 further involves receiving a request to perform a workload using distributed processing, as shown in block 91. In response to the request, the distributed workload controller identifies broadband gateways to process the workload based on the tracked usage of the broadband gateways. For example, broadband gateways that are currently idle may be identified. Method 90 next involves the distributed workload controller sending requests for the identified broadband gateways to process respective portions of the workload, as shown in block 94. The distributed workload controller next compiles results of the workload processing by the broadband gateways, as shown in block 95. The results are used to identify errors, to determine when processing of the workload needs to be adjusted, and/or to determine when processing of the workload is completed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing and/or fiber-based network devices, such as one or more computers or other devices that manipulate or transform data represented as physical electronic, magnetic, or optical quantities within memories, registers, or other information storage devices, transmission devices, or display devices.

The system or systems discussed herein are not limited to any particular hardware architecture or configuration. A device can include any suitable arrangement of components that provides a result conditioned on one or more inputs.

Suitable devices include multipurpose microprocessor-based systems accessing stored software that programs or configures the system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a device.

Embodiments of the methods disclosed herein may be performed in the operation of such devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for providing network access and distributed workload processing using a fiber-based network, the system comprising:
    broadband gateways located at different premises, each broadband gateway at a respective premises and combining a gateway processor and a computing processor, wherein, for each broadband gateway, the gateway processor and the computing processor share a single multi-host network controller connecting the respective broadband gateway to the fiber-based network,
        the gateway processor configured to provide access to the Internet to one or more devices at the respective premises via the fiber-based network by providing data packets from the fiber-based network to the one or more devices; and
        the computing processor configured to process distributed workloads at the respective premises and communicate via the fiber-based network; and
    a distributed workload controller for controlling the processing of distributed workloads using the broadband gateways accessed via the fiber-based network, wherein performance of a workload is distributed to be performed by multiple computing processors of broadband gateways at multiple premises.

2. The system of claim 1, wherein fiber-based network connects the broadband gateways to the Internet using a point-to-point architecture.

3. The system of claim 1, wherein the distributed workload controller distributes the workload for high-performance computing (HPC) by processing portions of the workload in parallel on multiple computing processors, wherein the processing achieves HPC by processing above a teraflop ($10^{12}$) floating-point operations of the workload per second.

4. The system of claim 1, wherein each broadband gateway includes a single circuit board comprising the gateway processor and the computing processor.

5. The system of claim 1, wherein each broadband gateway comprises a computing node comprising the computing processor, a high-speed Random Access Memory (RAM) used for computation, and a hard drive for long term storage of an operating system, supporting applications, or client-specific software.

6. The system of claim 1, wherein the computing processor of each broadband gateway is more powerful than the gateway processor of the respective broadband gateway.

7. The system of claim 1, wherein, in each broadband gateway, the computing processor and gateway processor are a single processor.

8. The system of claim 1,
    wherein the heat of computing processors required to process the workload is distributed to the multiple premises; and
    wherein the power requirements of computing processors required to process the workload is distributed to the multiple premises and serviced by multiple power transformers or multiple power grids.

9. The system of claim 1, wherein the multiple premises are distributed over multiple states of the United States of America.

10. The system of claim 1, wherein the fiber-based network provides approximately 25 Gigabit or greater communication speed to the respective premises.

11. The system of claim 1, wherein customers pay individually for the network access and workload processing at the different premises.

12. The system of claim 1, wherein the workload comprises analyzing a genome, analyzing financial data, analyzing physics data, or decrypting a code.

13. The system of claim 1, wherein the distributed workload controller comprises multiple child distributed workload controllers located at different centralized switching centers, the child distributed workload controllers coordinating to schedule processing of the workload in multiple areas serviced by multiple central office switching centers.

14. A device providing a broadband gateway at a premises, the device comprising:
    a gateway processor configured to provide access to the Internet to one or more devices at the premises via a fiber-based network by providing data packets from the fiber-based network to the one or more devices;
    a computing processor configured to process a portion of a distributed workload and communicate via the fiber-based network, wherein computing processors of multiple broadband gateways at multiple premises are configured to process the distributed workload;
    a multi-host network controller connecting the gateway processor and the computing processor to the fiber-based network; and
    a housing enclosing the gateway processor, the computing processor, and the network controller.

15. The device of claim 14, wherein the gateway processor provides an IP router providing access to the one or more devices via a wireless wide area network at the premises, wherein the gateway processor performs Network Address Translation (NAT) for the one or more devices at the premises, wherein each of the one or more devices at the premises is assigned a private Internet Protocol (IP) address, wherein the gateway processor translates packets from the one or more devices at the premises to be sent on the fiber-based network using a public IP address that is addressable on the Internet.

16. The device of claim 14, wherein the multi-host network controller provides Remote Direct Memory Access (RDMA) over Ethernet to the computing processor's random direct access memory (RAM).

17. The device of claim 14, wherein fiber-based network connects the broadband gateway to the Internet using a point-to-point architecture.

18. A method for providing network access and distributed workload processing using a fiber-based network, the method comprising:
  receiving, at a broadband gateway in a home, data packets from outside of the home via a fiber-based network, wherein the broadband gateway combines a gateway processor and a computing processor that share a single multi-host network controller connecting the broadband gateway to the fiber-based network;
  performing, at the gateway processor in the home, Network Address Translation (NAT) to send the data packets to one or more devices in the home;
  receiving, at the broadband gateway in the home, a request to process a portion of a distributed workload via the fiber-based network;
  processing, at the computing processor in the home, the portion of the distributed workload; and
  providing, from the broadband gateway in the home, a result of the processing via the fiber-based network.

19. The method of claim 18, wherein a distributed workload controller on the fiber-based network sends the request for the broadband gateway in the home to process the portion of the workload and receives the result of the processing, wherein the distributed workload controller distributes the workload to multiple broadband gateways in multiple homes.

20. The system of claim 1, wherein the workloads are distributed to computing processors at the respective premises via the fiber-based network, wherein the fiber-based network is fiber-to-the-home (FTTH), fiber-to-the-building (FTTB), or fiber-to-the-premises (FTTP).

21. The system of claim 1, wherein the workloads are distributed to computing processors at the respective premises via the fiber-based network, wherein the fiber-based network is an optical network connecting an Internet Service Provider (ISP) to home or business premises.

22. The system of claim 1, wherein the workloads are distributed to computing processors at the respective premises via the fiber-based network, wherein the fiber-based network is an optical network connecting a centralized switching center to home or business premises.

23. The system of claim 1, wherein the workloads are distributed to computing processors at the respective premises via the fiber-based network, wherein the fiber-based network is a passive optical network connecting a centralized switching center or Internet Service Provider (ISP) to home or business premises.

* * * * *